United States Patent [19]

Henning

[11] 4,276,737
[45] Jul. 7, 1981

[54] VEGETATION CUTTER

[75] Inventor: Brian C. R. Henning, Hayes, England

[73] Assignee: Black & Decker, Inc., Newark, Del.

[21] Appl. No.: 81,429

[22] Filed: Oct. 3, 1979

[51] Int. Cl.$^3$ .......................................... A01D 35/26
[52] U.S. Cl. .................................................... 56/12.8
[58] Field of Search ...................... 56/12.8, 12.9, 13.1, 56/13.2

[56] References Cited

U.S. PATENT DOCUMENTS

| 3,452,523 | 7/1969 | Svensson | 56/12.8 |
| 3,593,505 | 7/1971 | Mittelstadt | 56/12.8 |
| 3,760,570 | 9/1973 | Ehrlich et al. | 56/12.8 |

FOREIGN PATENT DOCUMENTS

| 3637 | 8/1979 | European Pat. Off. | 56/12.8 |
| 1263385 | 3/1968 | Fed. Rep. of Germany | 56/12.8 |
| 1912286 | 1/1971 | Fed. Rep. of Germany . | |
| 2337721 | 2/1975 | Fed. Rep. of Germany . | |
| 2627167 | 12/1977 | Fed. Rep. of Germany . | |
| 443763 | 9/1965 | Switzerland . | |
| 1448539 | 8/1976 | United Kingdom . | |

Primary Examiner—Robert A. Hafer
Attorney, Agent, or Firm—Walter Ottesen; Leonard Bloom; Edward D. Murphy

[57] ABSTRACT

The invention is directed to an air cushion supported vegetation cutter including a cutter casing housing an impeller for creating the air cushion in conjunction with the casing. An aperture in the casing permits air flow to the impeller and a support structure supports a motor for driving the impeller. The support structure provides a duct for the flow of cooling air over the motor and the duct has cooling air outlets located upstream of the aperture in the casing. This arrangement provides an improved motor cooling arrangement in which the motor cooling air and the air for the impeller interact upstream of the impeller.

16 Claims, 3 Drawing Figures

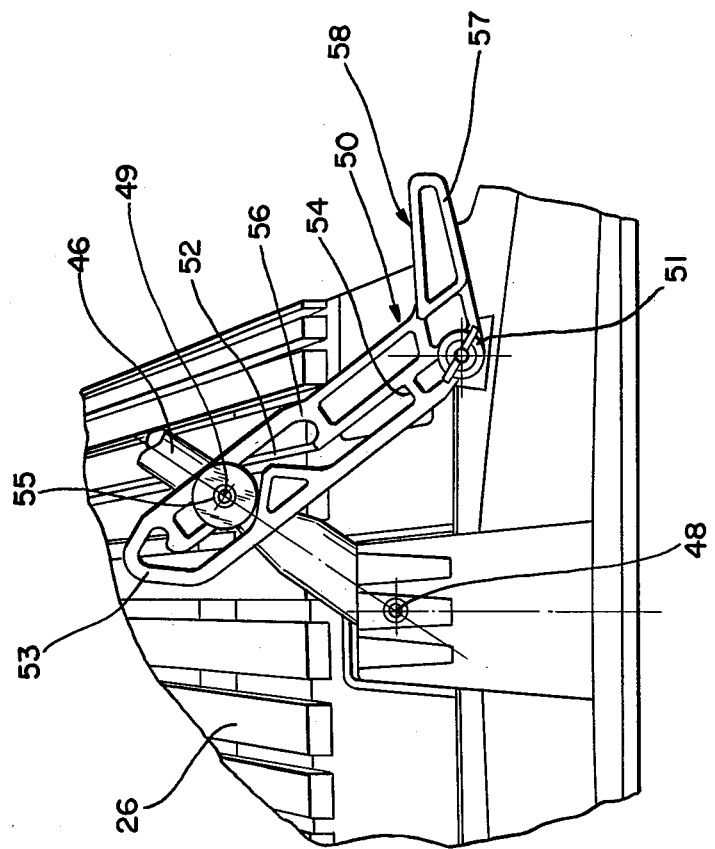

VEGETATION CUTTER

BACKGROUND OF THE INVENTION

This invention relates to vegetation cutters and has more particular reference to lawnmowers of the rotary type that are, in use, supported upon a cushion of air.

It is known to provide an air-cushion supported vegetation cutter in which an impeller for generating the air cushion, the cutter, and the armature are mounted on a common shaft. In an arrangement of this kind it has been proposed to provide a cooling air flow over the motor to prevent the motor overheating. Such a cooling air flow may be provided by a separate motor fan but if the fan is to provide all of the cooling air flow it must be quite bulky due to its relatively slow speed. Thus relying upon a separate motor fan to provide all the flow of motor cooling air is not entirely satisfactory.

It has been proposed to provide a cooling arrangement in which the impeller that generates the air cushion also provides all the cooling air flow over the motor and thus the disadvantages of providing a separate motor fan are overcome. In this proposed arrangement, however, the cooling air flow for the motor is kept apart from the other intake of air flow on the inlet side of the impeller and the two air flows do not combine until they are acted upon by the impeller; the impeller therefore has to provide all the power for the motor cooling air flow.

SUMMARY OF THE INVENTION

It is an object of the invention to provide an air-cushion-supported vegetation cutter such as a lawnmower and the like having an improved motor cooling air flow arrangement.

According to the invention, an air-cushion-supported vegetation cutter includes casing housing an impeller for creating the air cushion in conjunction with the casing, an aperture in the casing to permit air flow to the impeller, and a support structure for supporting a motor for driving the impeller, the support structure providing a duct for the flow of cooling air over the motor, the duct having cooling air outlets located upstream, in the direction of air flow to the impeller, of the aperture in the casing.

Since the cooling air outlets are located upstream of the aperture in the casing, the motor cooling air flow and the main air flow, generated in use, meet upstream of the impeller so that the main air flow and the motor cooling air flow interact. Thus the motor fan, if provided, can be smaller and consume less power than would be the case if the fan were used to provide all the motor cooling air flow.

The support structure may include a sleeve housing in which the motor is mounted and a spider on which the sleeve housing is mounted, the spider itself being removably secured to the casing in a location over the aperture in the latter.

The support structure may be located within a motor cover detachably secured to the casing and having apertures to permit the entry of air into the cover. That air provides cooling air for the motor and an air supply for the impeller.

Preferably, the apertures in the motor cover are in two separate series. One series permits the entry of motor cooling air and the other series permits the entry of air for the impeller. The air paths through the two series of apertures are defined by means including a baffle housed within the cover. The baffle may support an air filter for filtering motor cooling air.

The apertures of the other series are so dimensioned that they restrict the flow of air to the impeller. That restriction creates a pressure drop within the cover adjacent the air outlets in the motor support structure. That pressure drop in conjunction with the increase in velocity of the air as it approaches and flows through the aperture in the cutter promotes an increase in the flow of cooling air over the motor.

Preferably, the apertures of the other series are so located that the direction of flow of air from those apertures to the aperture in the casing tends to assist air flow exiting through the cooling air outlets. One way of achieving the desired direction is to locate the apertures of the other series some distance above (when the cutter is viewed in its working position) the cooling air outlets. In that way, a downwardly-directed air flow is produced adjacent the cooling air outlets and this assists flow of cooling air over the motor. The downward flow pattern may be assisted by suitable guide surfaces within the motor cover.

Restricting the flow of air to the impeller also has another advantage, namely to make the power consumed by the impeller more sensitive to the speed of the motor. When, in use, the machine changes from operating with virtually no load on the cutter, to operating with substantial load on the cutter, a relatively small drop in the motor speed gives a large drop in the power consumed by the impeller and therefore makes considerable power available to the cutter.

BRIEF DESCRIPTIONN OF THE DRAWINGS

By way of example only, an embodiment of the invention will now be described in greater detail with reference to the accompanying drawing of which:

DESCRIPTION OF THE PREFERRED EMBODIMENTS OF THE INVENTION

Figure 2:
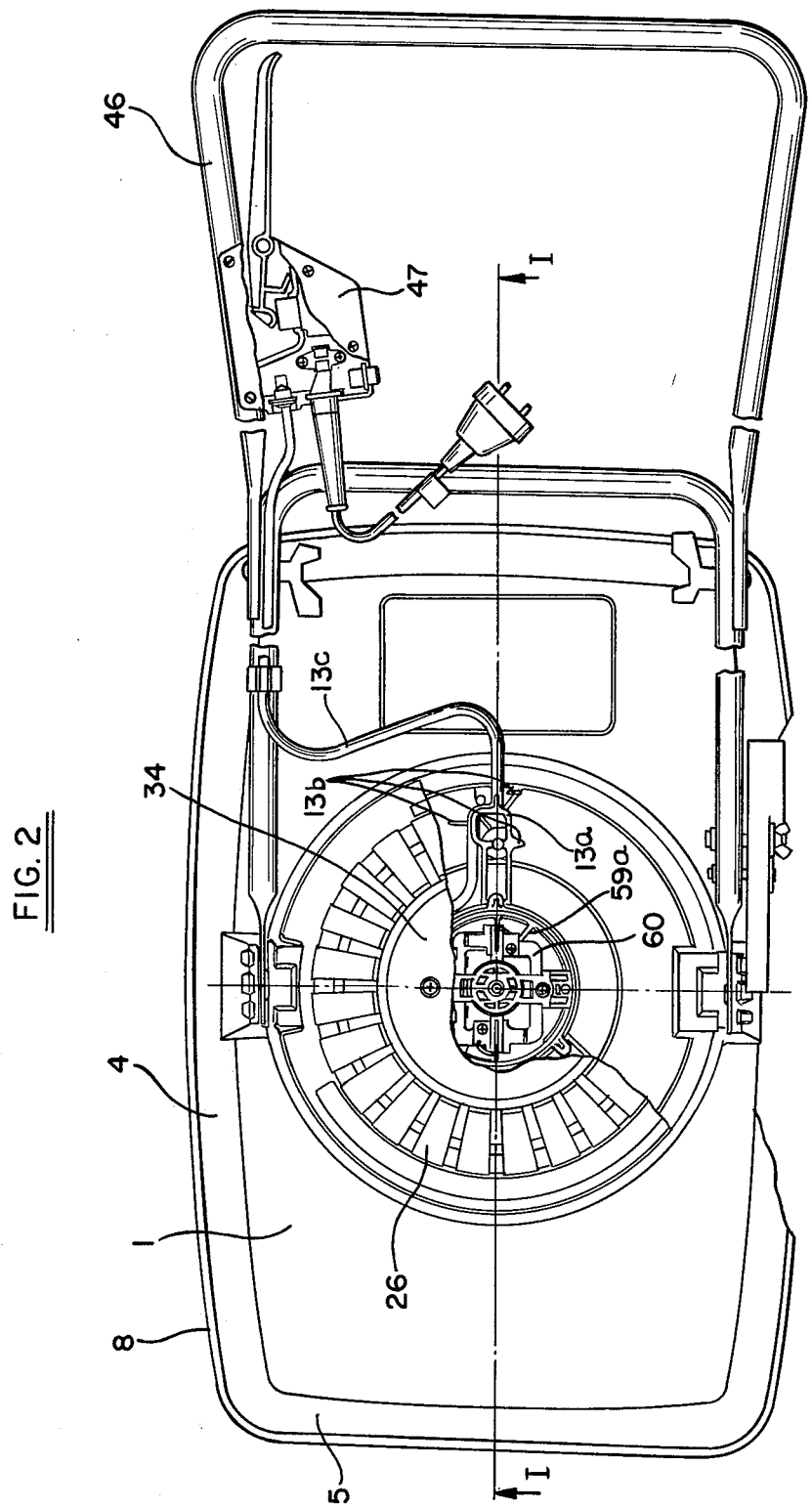
FIG. 2 is a plan view on a reduced scale of the embodiment cut away to reveal internal components, certain components having been removed; and, FIG. 3 is a side view of a component.

The embodiment comprises a cutter casing 1 which serves to house a cutter bar 2 and impeller 3 and to define the space within which the air cushion is to be created. The casing 1 is of rectangular shape when seen in plan as in FIG. 2 and has opposed longer sides 4 joined by opposed shorter sides 5.

The casing is of inverted saucer-like form with a downwardly-extending peripheral lip 6 contoured to provide a horizontal portion 7 upon which the mower rests when not in use and an outer upwardly-extending portion 8 which merges into portion 7 via a plane, inclined surface 9.

The casing 1 has a central aperture 10 in its upper surface. Round the aperture 10, the casing 1 has three equi-spaced mounting blocks 11 on which is mounted a support "spider" 12.

The spider 12 has three equi-spaced arms 13 which extend radially from a central dished portion 14 of generally circular form when seen in plan.

The central dished portion 14 has a central aperture 15, and, surrounding the aperture 15, the portion 14 is formed to receive the outer race of a ball bearing whose inner race is secured to the armature shaft 16 of an electric driving motor to be described in more detail later. The portion 14 supports a "cuff" 14a of a resilient material, for example rubber, in which the outer race is supported. The cuff provides a degree of flexibility in the mounted and also thermally insulates the bearing.

One of the arms 13 has an extension 13a which cooperates with inclined projections 13b to form a cable clamp for an electric cable 13c supplying electric power to the motor.

At equi-spaced points around the outer periphery of the dished portion 14, the latter is formed with raised support surfaces 17 which recieve co-operating support surfaces 18 of a motor housing sleeve 19.

Figure 1:
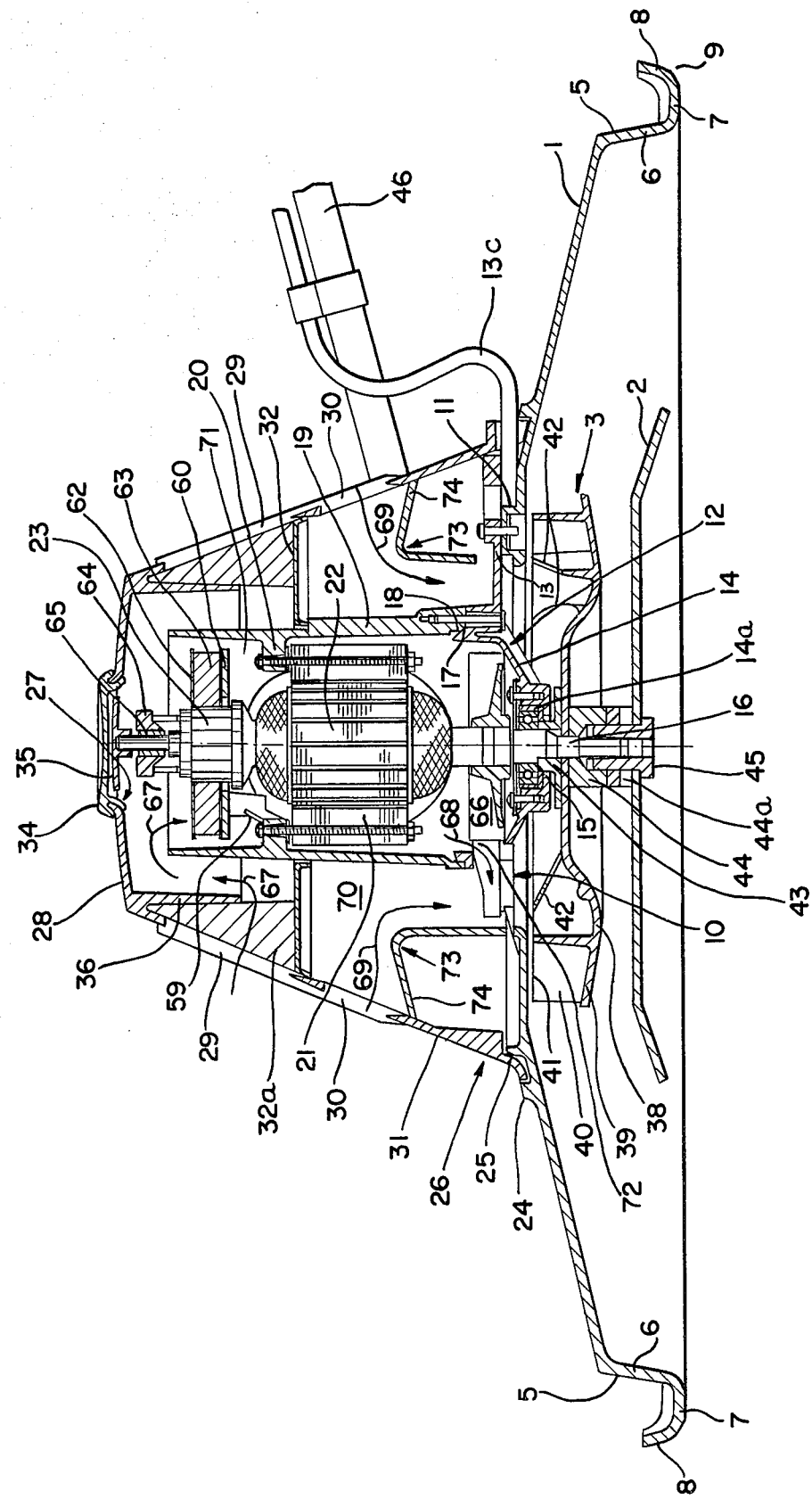
FIG. 1 is a vertical section through the embodiment on the line I-I of FIG. 2.

As can be seen from FIG. 1, the dished portion 14 of the spider 12 is located centrally of the aperture 10 in the casing 1, there being an annular gap between the periphery of the portion 14 and that part of the housing 1 surrounding the aperture 10. The arms 13 extend across the annular gap. In addition, the location of the spaces between the raised support surfaces 17 is such that they lie above the plane of the aperture 10.

The motor sleeve housing 19 has an internal ledge 20 which supports the stator 21 of the motor. The stack 21 is shown in diagrammatic form only but will comprise the conventional field windings supported upon a laminated core. The stack is bolted to the ledge 20 as shown in FIG. 1.

The shaft 16 carries a conventional rotor winding and laminated core indicated diagrammatically in FIG. 1 and 22. In use, current is supplied to the rotor winding via a commutator indicated schematically at 23 via brush contact described later.

The casing 1 has projections 24, 25 formed upon its upper surface which together provide a channel in which is located the lower edge of a motor cover 26 secured to the casing 1 by two screws (not shown).

The cover 26 is of domed form and of circular form when seen in plan. It has a central opening 27 in its upper surface 28 and a series of upper openings 29 and a series of lower openings 30 in its curved side wall 31. Supported between the motor cover 26 and the sleeve housing 19 is an annular baffle member 32 which has two apertures (not shown) through it. The baffle member 32 supports an air filer 32a.

The central opening 27 is closed by a plug-in cover 34 of transparent material to permit observation of an indicator 35 fixed to the upper end of the shaft 16.

Extending downwardly from the upper surface 28 and within the cover 26 is an annular partition 36 which, as can be seen from FIG. 1, overlaps the upper end of the sleeve 19 forming a baffle between the openings 29 and the upper, open end of the sleeve 19. The partition 36 assists in locating the air filter 32a.

Another baffle 73 extends upwardly around the periphery of the aperture 10 and has a downwardly and outwardly inclined upper portion 74 which meets the motor cover 26 below the lower openings 30 therein.

The lower end of the shaft 16 carries the centrifugal impeller 3 consisting of a plate-like base member 38 whose outer surface turns upwardly as at 39, and a series of curved vanes 40 located towards the edge of the base member 38. The vanes 40 are convexly-curved in the direction of rotation of the impeller. The upper edges 41 of the vanes 40 lie close to the undersurface of the casing 1 whilst each vane has an inclined leading edge 42 whose uppermost point lies directly beneath the edge of the casing 1 surrounding the aperture 10.

The impeller 3 is clamped between a central support sleeve 43 and a member 44. Mounted upon the shaft 16 below the member 44 is the cutter bar 2, the assembly just described being held in position by a component 45 screwed over the lower end of the shaft 16. Interposed between member 44 and the cutter bar 2 are spacers 44a. The shaft 16 terminates within the components 45, the latter having a central recess to receive one end of component 45 and allow the latter to be screwed on to the shaft end.

Mounted externally on the casing 1 is a handle 46 by means of which a user can manoeuvre the mower over a lawn or other grass area to be cut. Power for the motor is supplied via the lad 13c and an on/off switch contained in a swtich box 47 supported upon the handle. The switch box may contain a cut-out which may be either current or heat operated.

The handle 46 is pivotally attached to the housing 1, the pivot axis being indicated diagrammatically at 48 in FIG. 3.

The handle has a fixed projection 49 spaced a short distance from pivot axis 48. The projection cooperates with a gate member 50 (shown in FIG. 3) pivotally secured to the housing 1 at 51, to control movement of the handle and to enable the latter to be constrained in one or other of a number of different positions or range of positions.

The projection 49 extends into a gate 52 which is an elongated slot in the member 50 with end positions 53, 54 and, intermediate positions 55, 56. The member has an extension 57 with a broad upper surface 58 by which a user can pivot the member 50 when necessary.

By manufacturing the handle 46 and thus the location of the extension 49 in the gate 52 and pivoting the member 50, the user can determine which of the positons 53 .... 56 the projection 49 engages and thus the angular position of the handle 46 relative to the casing 1. Positoins 55 and 56 represent the limit of a range of angular positions over which the handle 46 is movable when the projection 49 is engaged in that part of gate 52 between those two positions.

The flange 20 of the housing 19 also supports a structure carrying the brushes of the motor. Arms 59 extending upwardly from the flange 20 carry a member 60 which encircles the commutator 23 of the motor. Additional support for the member 60 is provided by further arms 59a which extend from the inner surface of the upper part of the housing 19. The member 60 is of rectangular form when seen in plan as in FIG. 2. Mounted on member 60 in positions diametrically opposed with respect to the commutator 23 are brush holders 62 secured to the member 60 and containing carbon brushes 63 spring urged into contact with the commutator 23.

Mounted diametrically across the upper end of housing 19 is a support member 64 which carries a plain bearing 65 supporting the upper (as seen in FIG. 1) end of the motor shaft 16.

In use, the impeller 3 operates in the conventional manner to draw air from atmosphere in through the apertures 30 and thence via the aperture 10 into the casing 1 where it creates, in the now well known manner, an air cushion that supports the casing a short distance above the ground. At the same time, the cutter bar is rotated to sever blades of grass in its path of movement.

The spacers 44a allow some adjustment of the height above ground of the cutter bar 2. Relocation of a spacer from a position above the cutter bar 2 to a position below the cutter bar increases the height of the cutter bar.

As can be seen, the impeller and cutter bar are driven direclty by the motor, i.e. there is no speed reduction gearing employed. It thus becomes important to ensure an adequate flow of cooling air over the motor.

FIG. 1 shows a fan 66 secured to the shaft 16 just below the rotor 22. During use, the fan 66 creates a flow of air through the sleeve 19 especially through the stator stack 21. Air is drown in from atmosphere through the apertures 29, the air flowing through the filter 32a, round the baffle 36, into a duct 71 whose inlet is formed by the upper open end of sleeve 19, as indicated by arrows 67, and downwardly inside the latter and outwardly as indicated by arrow 68 through the outlets 72 between the raised suppoort surfaces 17 referred to above. The air flow over the motor joins the stream of air entering the housing via apertures 30 upstream (in the direction of air flow) of the aperture 10. Air flowing through apertures 30 has a downward direction as indicated by arrows 69 and this helps to draw air through the sleeve 19.

The apertures 30 are so dimensioned that they restrict the flow of air to the impeller 3 via the space 70 so creating in that space a pressure somewhat below atmospheric and this pressure, together with the increase in velocity of the air as it flows towards and through aperture 10 promotes an increase in the flow of cooling air in the sleeve 19.

The apertures 29 do not offer any significant resistance to air flow and there is thus created a pressure drop between the upper, open end of sleeve 19 and the lower end thereof and this pressure drop promotes the increase just referred to in the flow of cooling air through the motor.

Clearly, the restriction offered by the apertures 30 must not be so large as to prevent the setting-up of an adequate cushion of air to support the mower when in use and a compromise has to be reached between the flow of air through the apertures 30 that is required to ensure an adequate air cushion and that required to increase the flow of cooling air through the motor to an extent sufficient to limit the temperature rise thereof to acceptable limits.

The purpose of the baffle 32 is to separate the two air flows and to ensure an adequate air flow through the motor for cooling the latter. The apertures in the baffle 32 allow water entering the cover 26 via the apertures 29 to flow harmlessly to the impeller 3.

The baffle 73 prevents any water that enters the openings 30 impinging directly upon either the impeller 3 or the fan 66. If water were to impinge on either of these parts it might bounce off into the motor.

While in the described embodiment a separate motor fan is provided, it will be understood from the description above that the fan 66 is only one of the causes of the cooling air flow through the motor and accordingly the fan 66 may if desired be omitted with little loss of the cooling air flow over the motor.

What I claim is:

1. An air cushion supported vegetation cutter comprising:
    a casing having an opening therein; an impeller housed in sid casing for drawing a flow of air through said opening to create an air cushion in conjunction with said casing;
    a motor for driving said impeller; and
    a support structure for supporting said motor and defining a duct for the flow of cooling air over said motor, said duct having cooling air outlet means located upstream in the air flow to said opening whereby said motor cooling air combines with and forms part of the air drawn by said impeller before the combined air is drawn through said opening.

2. A cutter as claimed in claim 1 wherein said support structure comprises: a sleeve housing in which said motor is mounted; and, a spider having a central portion with outwardly extending arms, said sleeve housing being mounted on said spider and said arms being removably secured to said casing, and said spider being in a location over said opening in the casing.

3. A cutter as claimed in claim 1 or 2 comprising: a motor cover detachably secured to said casing and having a plurality of apertures to permit the entry of air into said cover; and, said support structure being located within said motor cover.

4. A cutter as claimed in claim 3 wherein said plurality of apertures are grouped into a first set of apertures and a second set of apertures;
    said first set of apertures being located to permit the entry of motor cooling air and said second set of apertures being located to permit entry of air for said impeller.

5. A cutter as claimed in claim 4 comprising: a baffle arranged within said cover to define respective air paths through said sets of apertures.

6. A cutter as claimed in claim 5 comprising: an air filter for filtering motor cooling air, said air filter being supported by said baffle.

7. A cutter as claimed in claim 4 wherein the apertures of said second set of apertures are so dimensioned that they restrict the flow of air to said impeller.

8. A cutter as claimed in claim 7 wherein said outlet means is a plurality of outlets and said second set of apertures is located so as to cause the direction of flow of air therefrom to said opening in said casing to assist air flow exiting through said cooling air outlets.

9. A cutter as claimed in claim 8 wherein the apertures of said second set of apertures are located at some distance above (when the cutter is viewed in its working position) said cooling air outlets.

10. An air cushion supported vegetation cutter, comprising:
    a casing having an opening therein;
    an impeller housed in said casing for receiving air through said opening to create an air cushion in conjunction with said casing;
    a motor for driving said impeller;
    support means enclosing said motor and having air inlet means and air outlet means to permit cooling air to flow past said motor from said inlet means to said outlet means for cooling said motor;
    first duct means having first aperture means at one end to permit entry of air, and communicating at the other end with said opening for supplying the air thereto, said outlet means communicating with said first duct means whereby the motor cooling air combines with the air in said first duct means before passing through said opening; and
    said first aperture means being so dimensioned that in operation it restricts the necessary flow of air to said impeller creating a pressure drop adjacent said outlet means to promote an increase in the flow of cooling air past said motor.

11. The air cushion supported vegetation cutter recited in claim 10, further comprising:
a motor cover enclosing said motor and said support means and having second aperture means to permit entry of the motor cooling air; and
second duct means connecting said second aperture means to said air inlet means.

12. The air cushion supported vegetation cutter recited in claim 11, wherein said motor is an electric motor having a stator stack, and said support means comprises a sleeve housing to which said stator stack is secured.

13. The air cushion supported vegetation cutter recited in claim 10, wherein said first duct means in the vicinity of said opening is arranged so that the air entering through said first aperture means is flowing vertically downwards as it approaches said opening, and said outlet means is disposed adjacent said other end and so disposed that the motor cooling air enters said first duct means transversely to the vertically downwardly flowing air.

14. The air cushion supported vegetation cutter recited in claim 12 further comprising filter means associated with said second duct means for filtering the motor cooling air.

15. The air cushion supported vegetation cutter recited in claim 10 or 13, wherein said motor is an electric motor having a stator stack and an armature shaft on which said impeller is mounted, and further comprising a fan mounted on said armature shaft adjacent said outlet means for contributing to the flow of cooling air past said motor, especially through said stator stack.

16. The air cushion supported vegetation cutter recited in claim 11 wherein said first and second aperture means are formed by a first and second series of apertures respectively, said second series being located above said first series, and said first series being located at some distance above said cooling air outlet means.

* * * * *

UNITED STATES PATENT AND TRADEMARK OFFICE
CERTIFICATE OF CORRECTION

PATENT NO. : 4,276,737

DATED : July 7, 1981

INVENTOR(S) : Brian C. R. Henning

It is certified that error appears in the above—identified patent and that said Letters Patent is hereby corrected as shown below:

On the title page Insert:

-- (30) Foreign Application Priority Data

October 3, 1978    United Kingdom    39181/78 --.

Signed and Sealed this

Eleventh Day of May 1982

[SEAL]

*Attest:*

GERALD J. MOSSINGHOFF

*Attesting Officer*    *Commissioner of Patents and Trademarks*